(12) United States Patent
Miller et al.

(10) Patent No.: US 7,024,051 B2
(45) Date of Patent: Apr. 4, 2006

(54) CUSTOMIZING A DIGITAL IMAGING DEVICE USING PREFERRED IMAGES

(75) Inventors: Michael E. Miller, Rochester, NY (US); Kenneth A. Parulski, Rochester, NY (US)

(73) Assignee: Eastman Kodak Company, Rochester, NY (US)

(*) Notice: Subject to any disclaimer, the term of this patent is extended or adjusted under 35 U.S.C. 154(b) by 900 days.

(21) Appl. No.: 09/732,558

(22) Filed: Dec. 8, 2000

(65) Prior Publication Data

US 2005/0185055 A1    Aug. 25, 2005

Related U.S. Application Data

(63) Continuation-in-part of application No. 09/549,356, filed on Apr. 14, 2000.

(60) Provisional application No. 60/137,078, filed on Jun. 2, 1999.

(51) Int. Cl.
*N04N 1/46* (2006.01)
*G06K 9/40* (2006.01)
*G06K 9/00* (2006.01)

(52) U.S. Cl. ................ 382/263; 382/162; 358/518

(58) Field of Classification Search ........... 382/162, 382/167, 254, 263, 518; 358/518, 520, 521, 358/530, 532, 505; 348/234
See application file for complete search history.

(56) References Cited

U.S. PATENT DOCUMENTS

| | | | |
|---|---|---|---|
| 4,642,670 A | 2/1987 | Striny | 357/68 |
| 4,774,574 A | 9/1988 | Daly et al. | 358/133 |
| 4,962,419 A | 10/1990 | Hibbard et al. | 358/37 |
| 5,189,511 A | 2/1993 | Parulski et al. | 358/80 |
| 5,300,974 A | 4/1994 | Stephenson | 396/311 |
| 5,440,401 A * | 8/1995 | Parulski et al. | 386/124 |
| 5,477,264 A | 12/1995 | Sarbadhikari et al. | 348/231 |
| 5,493,335 A | 2/1996 | Parulski et al. | 348/233 |
| 5,633,678 A | 5/1997 | Parulski et al. | 348/232 |
| 5,652,621 A | 7/1997 | Adams, Jr. et al. | 348/272 |
| 5,734,425 A | 3/1998 | Takizawa et al. | 348/231 |
| 5,828,769 A * | 10/1998 | Burns | 382/118 |
| 5,914,748 A | 6/1999 | Parulski et al. | 348/239 |
| 6,643,398 B1 * | 11/2003 | Moriwaki | 382/167 |
| 2003/0177448 A1 * | 9/2003 | Levine et al. | 715/530 |

OTHER PUBLICATIONS

PC Card Standard Release, 2.0, published by the Personal Computer Memory Card International Association, Sunnyvale, California, Sep. 1991.

(Continued)

*Primary Examiner*—Jerome Grant, II
(74) *Attorney, Agent, or Firm*—Pamela R. Crocker

(57) ABSTRACT

A method for customizing a digital imaging device for at least one particular user is disclosed. The digital imaging device includes a programmable memory for storing at least one firmware component which controls the operation of the digital imaging device. The method includes providing customization software which can access a plurality of firmware components providing different image appearances, the customization software producing a plurality of images of the same scene having a corresponding plurality of different appearances. The user selects one of the plurality of images having a preferred appearance to cause the customization software to access the corresponding firmware component(s). The selected corresponding firmware component(s) are provided to the digital imaging device and the programmable memory of the digital imaging device is reprogrammed to store the corresponding firmware component(s) to thereby customize the digital imaging device.

39 Claims, 10 Drawing Sheets

OTHER PUBLICATIONS

CompactFlash Specification Version 1.3, published by the Compact Flash Association, Palo Alto, California, Aug. 5, 1998.

U.S. Appl. No. 09/290,290, filed Apr. 13, 1999, Eye Color Defect Detection and Correction in a Digital Image by Fredlund et al.

U.S. Appl. No. 09/224,547, filed Dec. 31, 1998, Producing Panoramic Digital Images by Digital Camera System by May et al.

U.S. Appl. No. 08/977,382, filed Nov. 24, 1997, Electronic Camera With "Utilization" Selection Capability by Parulski et al.

U.S. Appl. No. 09/004,046, filed Jan. 7, 1998, Network Configuration File for Automatically Transmitting Images From an Electronic Camera by Ward et al.

U.S. Appl. No. 09/540,807, filed Mar. 31, 2000, A Color Transform Method for the Mapping of Colors in Images.

* cited by examiner

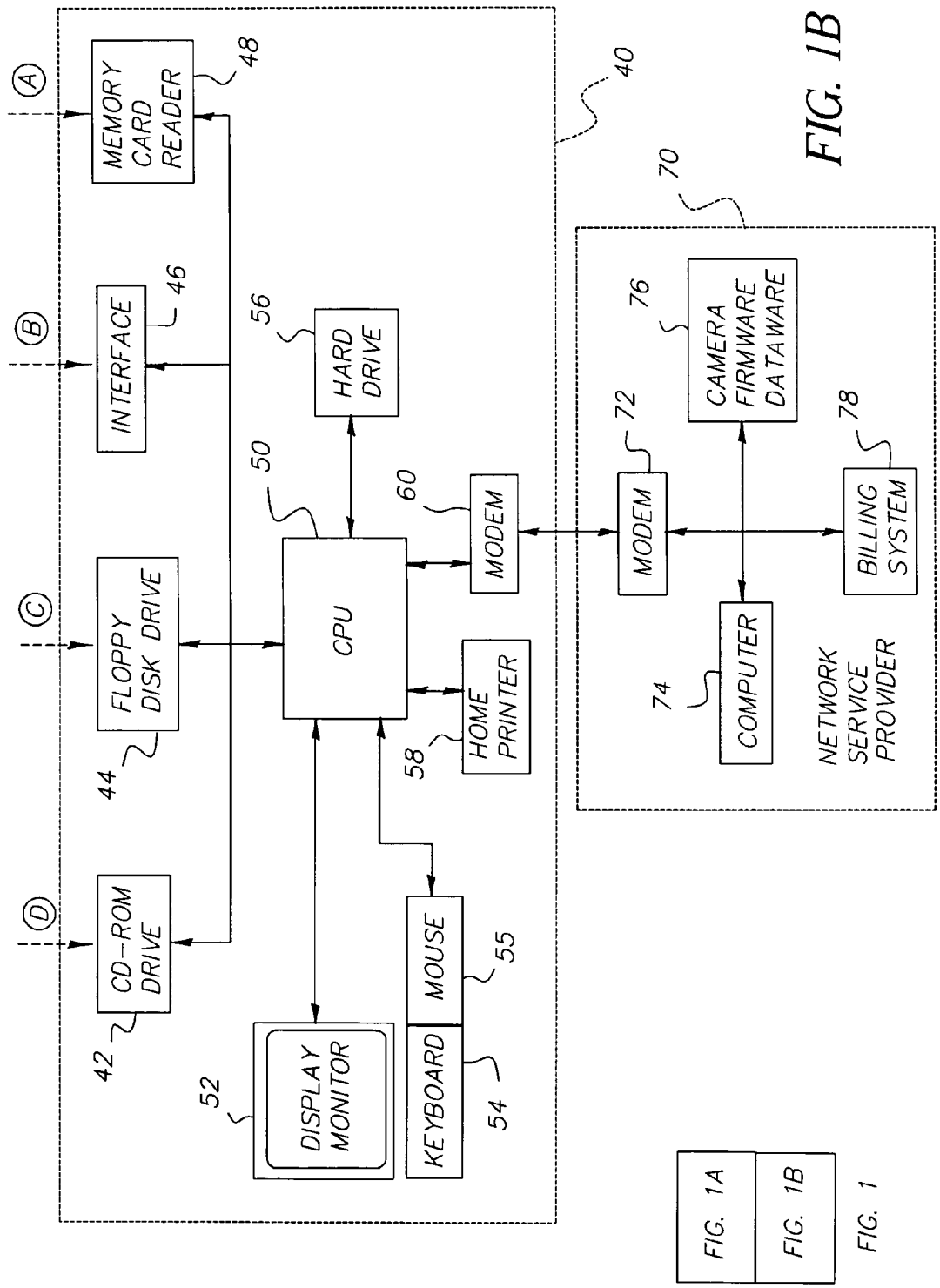

CUSTOMIZING A DIGITAL IMAGING DEVICE USING PREFERRED IMAGES

CROSS REFERENCE TO RELATED APPLICATIONS

This is a continuation-in-part of U.S. patent application Ser. No. 09/549,356, filed Apr. 14, 2000, entitled "Customizing A Digital Camera." Reference is made to commonly-assigned U.S. Provisional Patent Application Ser. No. 60/137,078, filed Jun. 2, 1999, entitled "Method and Apparatus for Customized Automation of Digital Image Transfer" to Wasula et al., commonly-assigned U.S. patent application Ser. No. 09/271,855, filed Mar. 19, 1999, entitled "A Method For Selectively Or Automatically Matching The Characteristics Of A Display To A Language" by Prabhu et al., commonly assigned U.S. patent application Ser. No. 09/534,469, filed Mar. 24, 2000 entitled "Configuring and Purchasing Imaging Devices" by Parulski, commonly-assigned U.S. patent application Ser. No. 09/534,470, filed Mar. 24, 2000 entitled "Purchasing Configured Photographic Film Products" by Parulski, and commonly-assigned U.S. patent application Ser. No. 09/534,471, filed Mar. 24, 2000, entitled "Leasing A Configured Camera" by Parulski, the disclosures of which are herein incorporated by reference.

FIELD OF THE INVENTION

This invention relates generally to the field of digital imaging devices, such as digital cameras, scanner, and printers, and in particular, to customizing digital image processing within such digital imaging devices for particular users using preferred images.

BACKGROUND OF THE INVENTION

Digital cameras, such as the Kodak DC280™ digital camera, sold by the Eastman Kodak Company, enable images to be utilized on a home personal computer (PC), printed locally or remotely, and incorporated into e-mail documents and personal World-Wide-Web home pages which can be accessed via the Internet. The camera's graphic user interface (GUI) enables the user to select image processing settings, such as the image sharpness, from a list of settings including "normal", "sharper", and "less sharp". Unfortunately, an inexperienced user may not understand how these settings affect the captured images, or may need to complete a tiresome trial-and-error process to arrive at the settings which they prefer. There are many different image processing software applications for home PCs that allow images to be modified, for example, by adjusting the sharpness, brightness, or color saturation. Unfortunately, these programs are difficult for inexperienced users. Such users often do not understand these technical terms, or the adjustments that are possible. As a result, they are either not able to obtain the types of images they prefer, or alternatively, must complete a tiresome trial-and-error process using various settings before they arrive at settings which they prefer.

Digital scanners, such as print or film scanners, and digital hardcopy printers can also include user controls to modify the image sharpness, contrast, and/or color. Again, these require a tedious trial-and-error process by the user in order to arrive at preferred settings.

On the other hand, the inventors of the present invention have recognized that even the most inexperienced user is able to pick a preferred image from a group of images having the same subject but different types of image processing.

SUMMARY OF THE INVENTION

Accordingly, it is an object of the present invention to customize the digital image processing within a digital imaging device using preferred images.

This object is achieved by a method for customizing a digital imaging device for at least one particular user by storing at least one firmware component in a programmable memory of the digital imaging device which controls the operation of the digital imaging device, the method comprising the steps of:

(a) providing customization software which can access a plurality of firmware components providing different image appearances, the software producing a plurality of images of the same scene having a corresponding plurality of different appearances;

(b) the user selecting one of said plurality of images to cause the customization software to access the corresponding firmware component(s); and (c) providing the selected corresponding firmware component(s) to the digital imaging device and programming the programmable memory of the digital imaging device to store the corresponding firmware component(s) to thereby customize the digital imaging device.

Advantages

It is an advantage of the present invention for a particular user to customize a digital imaging device by viewing a plurality of images of a scene having different image attributes, and by selecting a preferred appearance.

It is another advantage of the present invention to enable an inexperienced user to easily customize the appearance of images produced by a digital imaging device.

BRIEF DESCRIPTION OF THE DRAWINGS

FIGS. 1A and 1B, when taken together, are a block diagram of a digital imaging system in accordance with the present invention for customizing a digital imaging device using preferred images;

DETAILED DESCRIPTION OF THE INVENTION

In accordance with the present invention, customization software for a digital imaging device, such as a digital camera, provides the user with sets of digital images, and asks the user to choose which of the images is preferred out of each set. The images have noticeable differences in flesh tones, sharpness, contrast, and other image attributes. Based on the user's choices, the customization software customizes the firmware in the digital imaging device to provide the type of images preferred by the user. For example, a first user may prefer more vibrant colors, and sharper, higher contrast images. A second user may prefer softer looking images. Based on the user's selections, the edge enhancement setting, color correction matrix, and tone correction lookup tables can be modified. Alternatively, the digital imaging device can include a programmable memory which stores the parameter settings. For example, the programmable memory can store one or more edge enhancement settings, color correction settings and/or tone correction settings. When the user selects a preferred image, the customization software determines the associated setting(s), and the programmable memory stores the associated setting(s). The customization software can be executed external to the digital imaging device (e.g., by a separate host computer), or alternatively, can be executed by the processor in the digital imaging device. In the latter case, the sets of digital images are displayed on the image display of the digital imaging device so that the customization process can be performed using only the digital imaging device, without the use of the host computer.

Figure 1A:
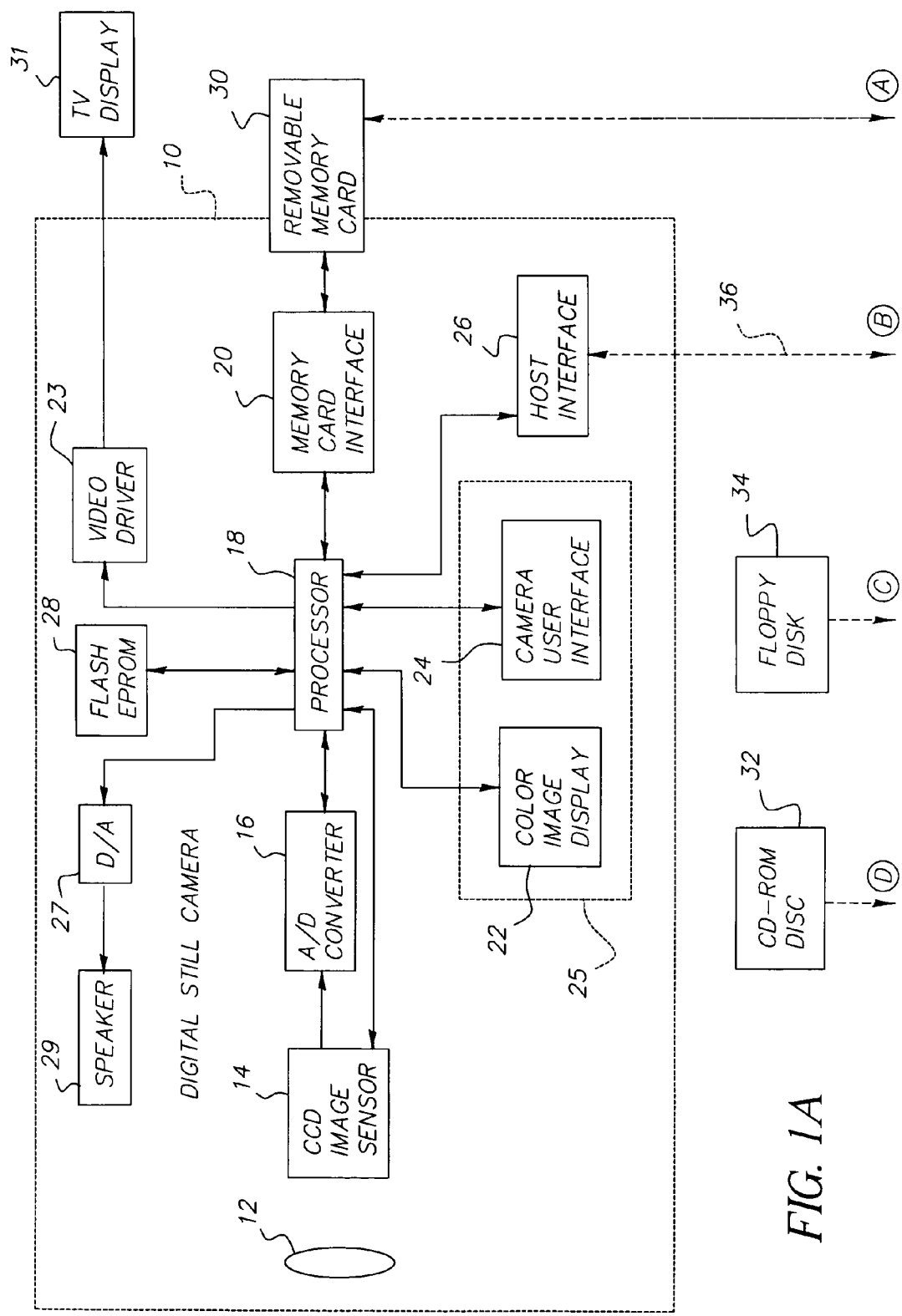

FIGS. 1A and 1B, when taken together, are block diagrams of a digital imaging system in accordance with the present invention, which enables users to easily customize the appearance of images from a digital imaging device, such as a digital camera, by setting image processing parameters based on user preferred images. The digital imaging system includes a digital camera 10 which is supplied along with camera customization software provided on a compact disc CD-ROM 32, a floppy disk 34, or other digital media. The digital imaging system also includes a host computer 40, such as a Dell Dimension XPS M200, and a Network Service Provider 70. In accordance with one embodiment of the present invention, camera customization software is executed external to the digital camera 10, and is typically executed on the host computer 40. The camera customization software accesses software code which permits firmware in the digital camera 10 to be customized by a user. The software code can be source code which is compiled by the camera customization software to create executable firmware. Alternatively, the software code can be compiled firmware components or firmware settings which are accessed by the camera customization software. The camera customization software can modify or combine firmware components in order to provide firmware which customizes the digital camera 10. The camera customization software also includes one or more applications that provide a series of interactive dialogues with the user so that the user may select preferred images.

Figure 4:
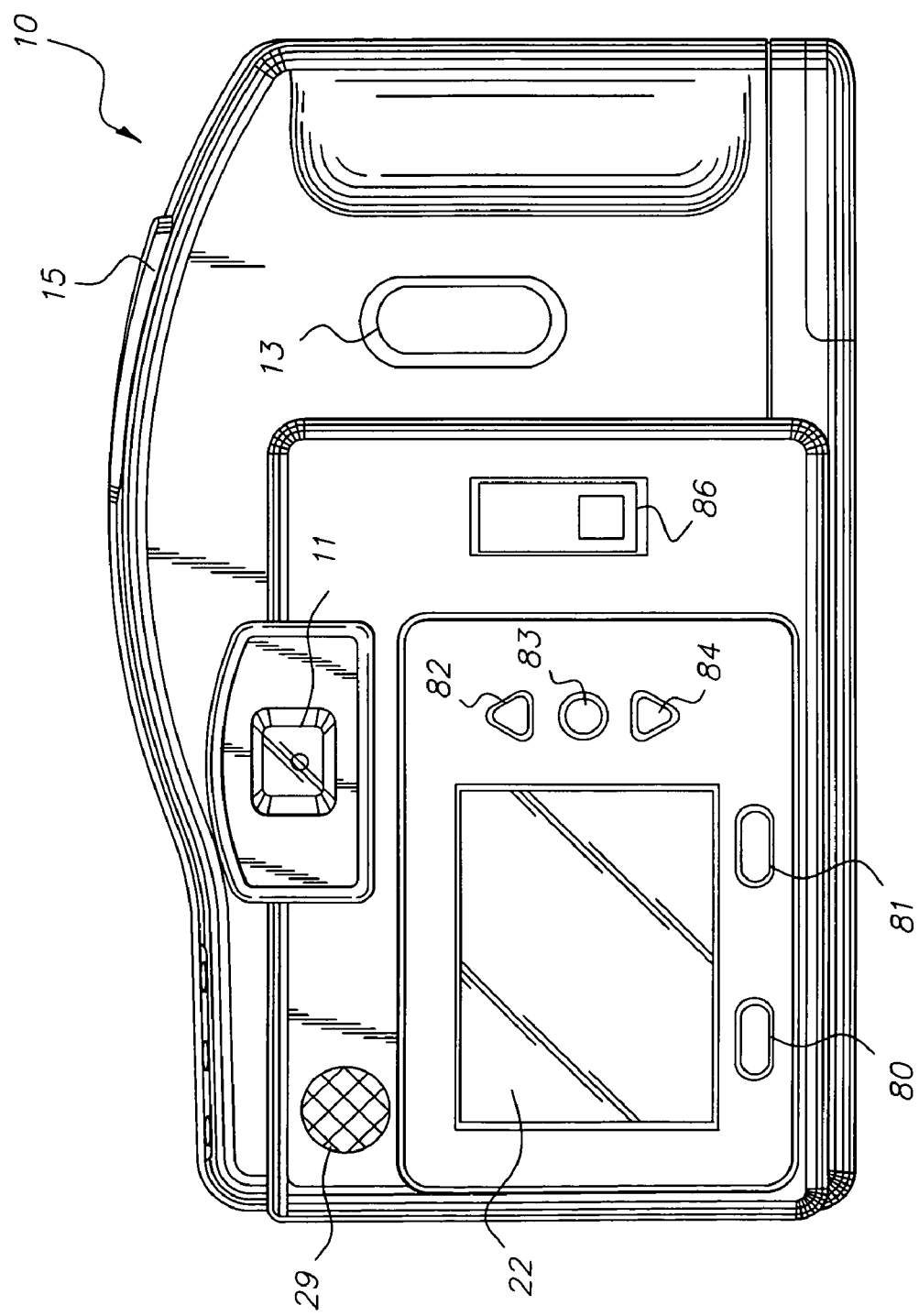
FIG. 4 is a rear view of the digital camera 10 of FIG. 1A including the color image display 22.

The digital camera 10 produces digital images that are stored on a removable memory card 30. The digital camera 10 includes an optical viewfinder 11 (shown in FIG. 4) for composing a scene (not shown), a 3:1 zoom lens 12 controlled by a zoom switch 13 (shown in FIG. 4) having telephoto (T) and wide angle (W) positions and having zoom and focus motor drives (not shown), and an adjustable aperture and shutter (not shown) for focusing light from a scene on an image sensor 14. The image sensor 14 can be, for example, a single-chip color charge-coupled device (CCD), using the well-known Bayer color filter pattern. When the user depresses a shutter button 15 (shown in FIG. 4), the analog output signal from the image sensor 14 is converted to digital data by an analog-to-digital (A/D) converter 16. The digital data is processed by a processor 18 controlled by firmware stored in a reprogrammable memory, such as a Flash EPROM 28.

The processed digital image file is provided to a memory card interface 20 which stores the digital image file on the removable memory card 30 or on another type of digital memory device, such as a floppy disk or magnetic hard drive. The removable memory card 30, which is well-known to those skilled in the art, can include, for example, a memory card adapted to the PCMCIA card interface standard, as described in the *PC Card Standard, Release* 2.0, published by the Personal Computer Memory Card international Association, Sunnyvale, Calif., September 1991. The removable memory card 30 can also be adapted to the Compact Flash interface standard, such as described in the *CompactFlash Specification Version* 1.3, published by the CompactFlash Association, Palo Alto, Calif., Aug. 5, 1998, or to other memory devices such as the well-known SSFDC (Solid State Floppy Disc Card) or Memory Stick formats.

The processor 18 performs color interpolation followed by color and tone correction, in order to produce rendered sRGB image data. This processing is described later with reference to FIG. 8. The processor 18 can include internal buffer memory to store a portion of the image, or to store one or more images. Alternatively, the processor 18 can use a separate external memory (not shown), such as DRAM memory. The rendered sRGB image data is then JPEG compressed and stored as a JPEG image file on the removable memory card 30. The processor 18 also provides a lower resolution or "thumbnail" size image data to a color image display 22, such as a color liquid crystal display (LCD), which displays the captured image for the user to review. A camera user interface 24 including a series of user buttons 80, 81, 82, 83, and 84 (shown in FIG. 4) and a capture/review mode switch 86 (shown in FIG. 4), is used to control the digital camera 10. The camera user interface 24, together with text and icons displayed on the image display 22 (shown also in FIG. 4), forms the camera graphical user interface (GUI). This GUI is controlled by the user interface portion of the firmware stored in the Flash EPROM 28. The digital camera 10 can also include a digital-to-analog (D/A) converter 27 and a miniature speaker 29 (also shown in FIG. 4) which makes audible sounds when a new picture is taken, or when the user changes modes or advances to review the next stored image. The digital camera 10 can also include a video output driver 23 which connects to a TV display 31, such as an NTSC format home television, for displaying the captured images on the TV display 31. The digital camera 10 further includes a strobe flash unit (not shown) for illuminating the subject when the ambient illumination level is low.

After a series of images has been taken by the digital camera 10 and stored on the removable memory card 30, the removable memory card 30 can be inserted into a memory card reader 48 in the host computer 40. Alternatively, an interface cable 36 can be used to connect between a host interface 26 in the digital camera 10 and a camera interface 46 in the host computer 40. The interface cable 36 may conform to, for example, the well-know universal serial bus (USB) interface specification. Alternatively, the interface cable 36 may conform to the RS-232 interface specification, the IEEE 1394 (Firewire) interface specification, or other cable interface specifications. Alternatively, the interface may utilize a wireless interface such as the well-known IrDA (Infrared Data Association) interface or an RF (radio frequency) interface such as the well-known Bluetooth RF interface.

The captured images from the digital camera 10 can be downloaded to the host computer 40 and stored on a hard drive 56 under the control of a central processing unit (CPU) 50. The CPU 50 is coupled to a display monitor 52, which is used to view the images, and a keyboard 54. A mouse 55 permits the user to readily communicate with the CPU 50. The CPU 50 communicates with a local printer 58, such as an Epson Stylus Photo 700 printer, which produces hard copy prints of the images captured by the digital camera 10.

The digital camera 10 can alternatively be a motion video camera that captures a series of image frames from the image sensor 14, as well as an audio signal from a microphone (not shown). The processor 18 then processes and compresses the image frames and audio information using a suitable compression method (e.g., MPEG-4 compression) to provide movie files that are stored on the removable memory card 30 or different type of digital recording media, such as digital video tape.

The digital camera 10 that is supplied to a user includes firmware stored in the Flash EPROM 28 which provides normal camera image processing to produce images preferred by "average" users. Users can customize the appearance of the images produced by the digital camera 10, as well as the functions offered by the digital camera 10, using the camera customization software provided with the digital camera 10. This camera customization software is provided on the CD-ROM disc 32, which is loaded into the host computer 40 via the CD-ROM drive 42, or provided on the floppy disk 34, which is loaded into the host computer 40 via the floppy disk drive 44. The CD-ROM disc 32 or the floppy disk 34 can also include digital image application software, such as the Picture Easy™ version 3.1 software developed by the Eastman Kodak Company. Alternatively, all of the camera customization software could be downloaded from the Network Service Provider 70 via a modem 60. The modem 60 communicates with a modem 72 at the Network Service Provider 70, which is connected to a computer 74, a camera firmware database 76, and a billing system 78 which can charge the user (e.g., via a credit card) for downloading the camera customization software. The CPU 50 uses the camera customization software in accordance with the present invention to provide custom firmware code, such as preferred parameter settings, which are downloaded under the control of processor 18 of the digital camera 10 via the removable memory card 30, and stored in the Flash EPROM 28, as described in commonly-assigned U.S. Pat. No. 5,477,264, entitled 'Electronic Imaging System Using a Removable Software-Enhanced Storage Device" to Sarbadhikari et al., or via the interface cable 36 as described in commonly-assigned U.S. Pat. No. 5,734,425, entitled "Electronic Still Camera With Replaceable Digital Processing Program" to Takizawa et al., the disclosures of which are herein incorporated by reference. The process of storing firmware code in an EPROM and of erasing firmware code from an EPROM is well known in the art, and need not be discussed in detail.

Figure 2:
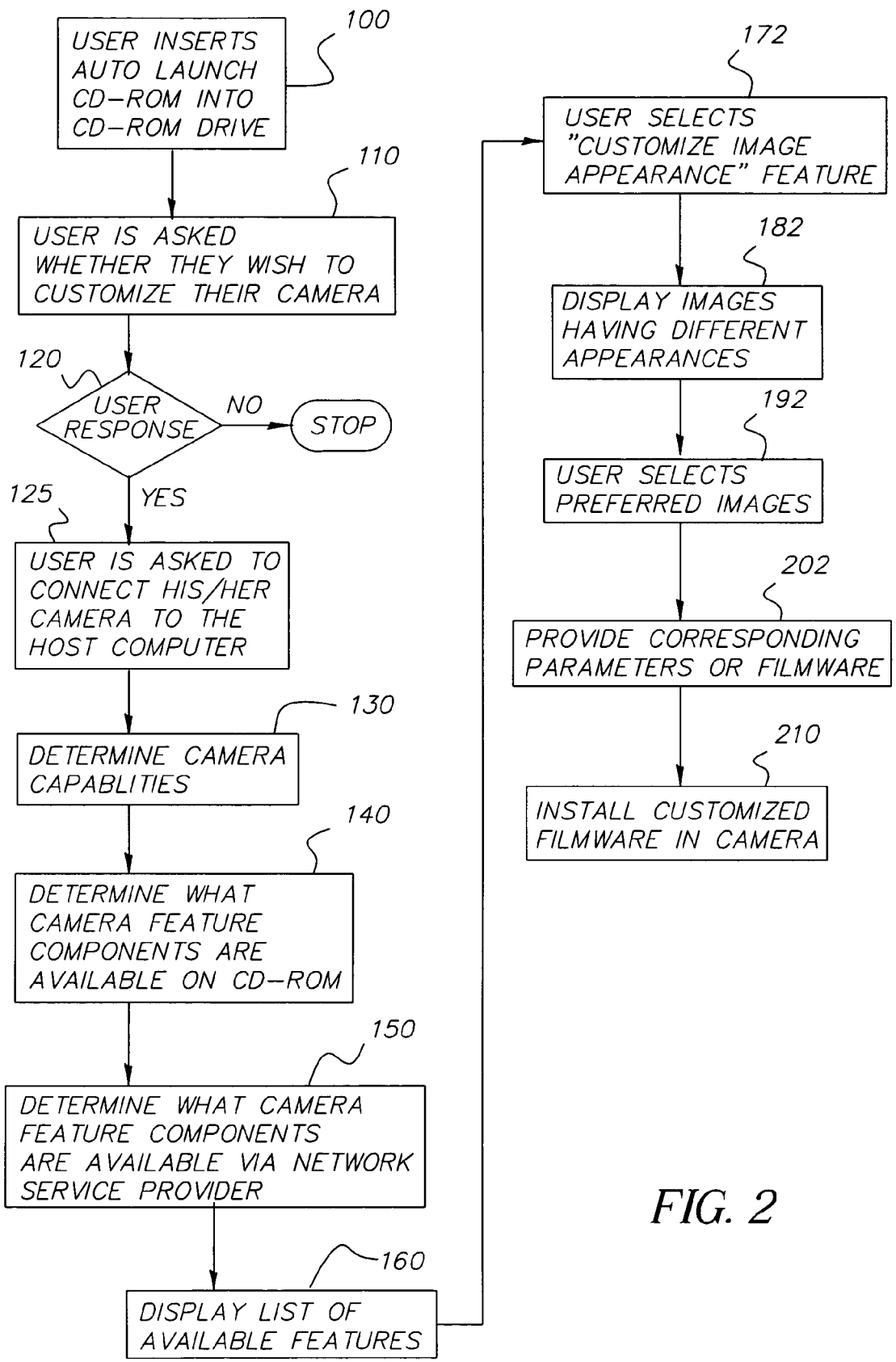
FIG. 2 is a flow diagram depicting the steps used in one exemplary embodiment of the invention.

FIG. 2 is a flow diagram depicting the steps used in customizing the digital camera 10 of FIG. 1A in accordance with a preferred embodiment of the present invention. As shown in FIG. 2, when the CD-ROM disc 32 provided with the digital camera 10 is inserted into the CD-ROM drive 42, the camera customization software is automatically launched (block 100) and executed by the CPU 50. The user is informed, via the display monitor 52, of the user's ability to enhance the capability of his/her newly purchased digital camera 10 and asked if the user wishes to do so at the present time (block 110). If the user responds "yes" (block 120), the user is asked to connect his/her digital camera 10 to the host computer 40 via the interface cable 36 (block 125). In block 130, the camera customization software then determines the capabilities of the digital camera 10 and an inventory of the features currently provided by the Flash EPROM 28. The capabilities of the digital camera 10 can be determined either by determining the camera model number or by determining the types of hardware features that the digital camera 10 can support and by the size of the memory of the Flash EPROM 28.

In block 140, the camera customization software determines which feature firmware components are available for this particular model camera via the software provided on the CD-ROM disc 32. In block 150, the camera customization software uses the modem 60 to determine whether other firmware components which provide new features for this model camera are available within the camera firmware database 76 at the Network Service Provider 70. The response from the Network Service Provider 70, received by the host computer 40, might include some firmware components that are available to the user at no charge, and other firmware components for which the user will be charged. In addition, the Network Service Provider 70 can track whether the user has previously purchased firmware components so that they can be downloaded again at no charge if the firmware component was lost by the user, or is otherwise unavailable. Further, the Network Service Provider 70 could offer discounts to the user based on previous purchases.

In block 160, the features provided by the available firmware components are displayed to the user on the display monitor 52 through an on-screen listing of these features. These features include enabling the user to customize the appearance of the images produced by their digital camera. In block 172, the user selects the customize image appearance feature.

Figure 3A:
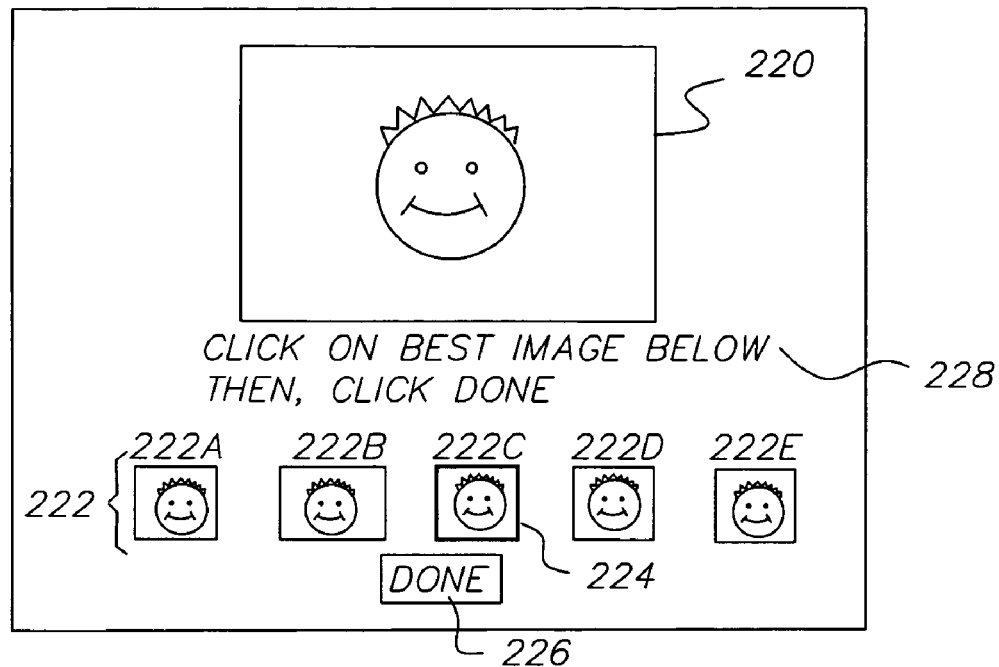
FIGS. 3A and 3B illustrate two graphical user interface screens displayed on the display monitor 52 of FIG. 1B in the process of customizing the digital imaging device of FIG. 1A.
Figure 3B:
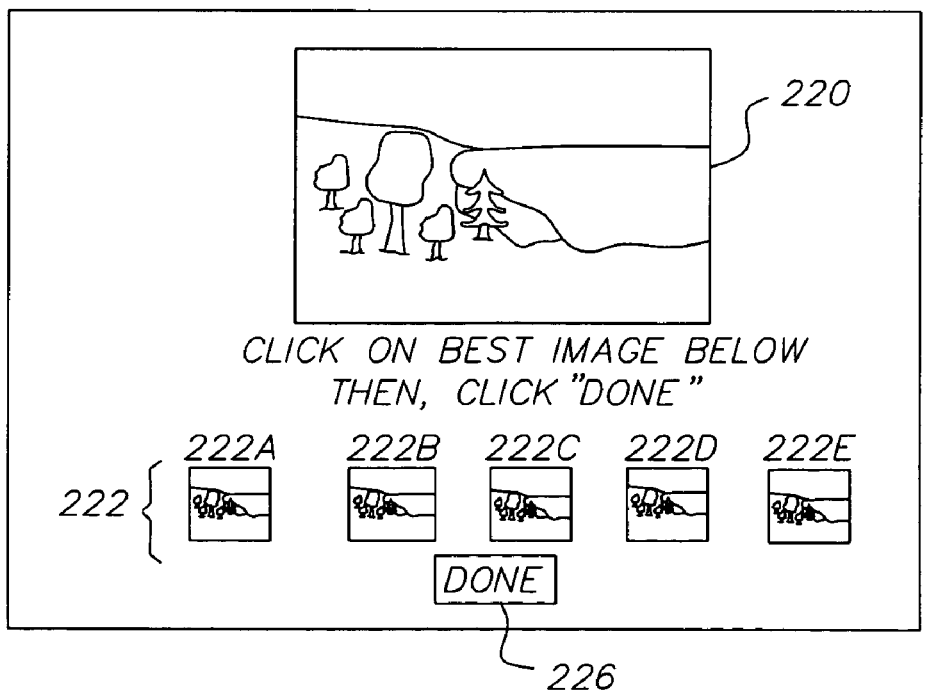

In block 182, the CPU 50 displays on the display monitor 52 a group of images, as depicted in FIG. 3A and FIG. 3B. The display includes a preferred image window 220 and a group of smaller image windows 222A, 222B, 222C, 222D, and 222E. The smaller image windows 222A to 222E show the same scene, but each with a noticeable different appearance. For example, the various images 222A–222E may have a range of contrasts, with the first image 222A having much lower than normal contrast, the second image 222B having slightly lower than normal contrast, the third (middle) image 222C having normal contrast, the fourth image 222D having slight higher than normal contrast, and the fifth image 222E having much higher than normal contrast.

The contrast of the image in the preferred image window 220 when the display depicted in FIG. 3A is first initiated corresponds to the normal contrast, and the area surrounding the middle image 222C includes an indicator 224 to indicate that this is the current setting. The indicator 224 may be provided, for example, by a color border in various shades, a blinking border, an icon (such as a checkmark) overlayed or adjacent to the selected image. User instructions 228 are also displayed, to tell the user to click on the "nicest looking" small picture, which then appears in the preferred image window 220. The user uses a standard input device, such as the mouse 55, to make this selection in block 192. For example, if the user preferred the appearance of the image with lower than normal contrast 222B, the user would click on image 222B. In response, the CPU 50 would update the display on the display monitor 52 so that the image displayed in preferred image window 220 had lower than normal contrast, matching the contrast of the selected image 222B, and move the indicator 224 to surround image 222B rather than 222C. At this point, the user can select a different image from among images 222A to 222E, in order to display images with other appearances as large images in the preferred image window 220, or the user can select the "done" icon 226.

After the user selects the "done" icon 226, the CPU 50 stores a value indicating the preferred contrast setting for this particular user, and updates the display on display monitor 52 to provide a second set of images. FIG. 3B is similar to FIG. 3A except that it uses either a different scene, or a different type of image appearance modification, or both. For example, the second set of images can be a different scene having the same type of contrast settings as depicted in FIG. 3A. This ensures that the user preference is based on a group of different scenes, rather than on a single particular scene. The different scenes have a range of scene types, including images that help indicate to the user potential artifacts that may occur for settings other than the normal setting, such as highlight clipping artifacts that may occur for the higher than normal contrast setting corresponding to image 222E. After several scenes have been evaluated for contrast, the contrast setting value most often selected by the user is chosen as the preferred contrast setting for the user. Another set of images is then displayed, having a different type of appearance modification. Instead of contrast, the variation may be a difference in color saturation, ranging between low, normal, and high color saturation, or a variation in sharpness, ranging from low to normal to high sharpness. The user is again instructed to select their preferred image, as was described in relation to FIG. 3A, and then select the "done" icon 226.

The camera customization software may include optional image processing algorithms, for example, a noise reduction algorithm. In this situation, the graphical user interface screen depicted in FIG. 3A and FIG. 3B may be modified to include only two images, one using the algorithm and the other not using the algorithm. The user then selects one of the two images of the same scene as their preferred image. As will be later described, the optional algorithm is then provided in block 202 of FIG. 2. only if the user has selected, as their preferred image, the image processed by the optional algorithm.

The CPU 50 under the control of the customization software may produce one or more hardcopy prints using home printer 58 shown in FIG. 1B. The print includes images of one or more scenes processed using the normal, default camera settings for all parameters and optional image processing algorithms, such as noise reduction. The print also includes images of the same scene(s) processed using the setting selected by the user, as a result of selecting their preferred images. The print further includes text indicating which images correspond to the normal settings, and which images correspond to the user preferred settings. The hard copy print enables the user to more carefully examine image artifacts and ensure that the selections they have made will provide superior prints, compared to the normal default settings.

In block 202 of FIG. 2, the customization software determines the firmware modules, parameters, or settings that provide the user preferred image appearance. In block 210, the firmware components, parameters or settings are uploaded to the Flash EPROM 28 in the digital camera 10 using the interface cable 36 in order to customize the appearance of images produced by the digital camera 10. This can be done by first erasing some of the firmware installed in Flash EPROM 28, and then uploading the new firmware components. Alternatively, this can be done by providing the parameters or settings to the digital camera 10 which modify the image processing operations, such as those described later in relation to FIG. 8. Alternatively, the camera customization software provided on the CD-ROM 32 or the Floppy disk 34 can include camera source code that must be compiled by a firmware compiler (not shown) designed to produce firmware capable of being executed by the processor 18, before being downloaded to the digital camera 10. In this situation, the camera customization software also includes the necessary compiler software.

The uploaded firmware can also modify the camera features and the camera user interface 24 as described in co-pending U.S. patent application Ser. No. 09/549,356, entitled "Customizing A Digital Camera" to Prabhu et al., the disclosure of which is incorporated herein by reference. These features can include:

Configuring the firmware stored in the Flash EPROM 28 in the digital camera 10 to add firmware components which provide special effects features, such as posterization or "coloring book" creative effects, monochrome or 20 septia effects, and special effects filters (e.g., star, defocus corners);

Configuring the firmware stored in the Flash EPROM 28 in the digital camera 10 to enable the user to upload, from the host computer 40 to the digital camera 10, particularly memorable personal images for sharing with others via the color image display 22 of the digital camera 10;

Configuring the firmware stored in the Flash EPROM 28 in the digital camera 10 to add a "slide show" capability to the digital camera 10 for automatically reviewing the image on an LCD or video display, for a selected period (e.g., five seconds per image) including "transition" effects (e.g. fades or pulls) from one image to the next;

Configuring the firmware stored in the Flash EPROM 28 in the digital camera 10 to add unique sounds to the camera user interface 24, such as, for example, funny noises as pictures are taken;

Configuring the firmware stored in the Flash EPROM 28 in the digital camera 10 to support various image resolution or compression levels, compression algorithms, or image tile formats, or to provide the ability to modify captured images as they are processed, such as by digital zooming and cropping, tone or color adjustments, or sharpness adjustments;

Configuring the firmware stored in the Flash EPROM 28 in the digital camera 10 to provide red-eye removal, as described in commonly assigned U.S. patent application Ser. No. 09/290,290, filed Apr. 13, 1999 to Fredlund, the disclosure of which is herein incorporated by reference;

Configuring the firmware components stored in the Flash EPROM 28 in the digital camera 10 to provide the ability to select one or more border templates that may be combined with newly captured digital images, as described in commonly assigned U.S. Pat. No. 5,477,264 to Sarbadhikari et al., the disclosure of which is herein incorporated by reference;

Configuring the firmware components stored in the Flash EPROM 28 in the digital camera 10 to group images into various categories or folders, as described in commonly assigned U.S. Pat. No. 5,633,678 to Parulski et al., the disclosure of which is herein incorporated by reference;

Configuring the firmware components stored in the Flash EPROM 28 in the digital camera 10 to provide the ability to stitch multiple images together to produce panoramic images, such as by using the method described in commonly assigned U.S. patent application Ser. No. 09/224,547, filed Dec. 31, 1998 to Parulski, the disclosure of which is herein incorporated by reference;

Configuring the firmware components stored in the Flash EPROM 28 in the digital camera 10 to provide print ordering from the camera, as described in commonly-assigned U.S. patent application Ser. No. 08/977,382, filed Nov. 24, 1997 to Parulski, the disclosure of which is herein incorporated by reference;

Configuring the firmware components stored in the Flash EPROM 28 in the digital camera 10 to composite multiple images together, for example, using the method and apparatus described in commonly-assigned U.S. Pat. No. 5,914,748 to Parulski, the disclosure of which is herein incorporated by reference;

Configuring the firmware components stored in the Flash EPROM 28 in the digital camera 10 to create html files to arrange the images into 10 a web page that has a customized background color, header text, image date/titles, and image size; and Configuring the firmware components stored in the Flash EPROM 28 in the digital camera 10 to provide the ability to e-mail images from the digital camera 10, for example, as described in commonly-assigned U.S. patent application Ser. No. 09/004,046, filed Jan. 7, 1998 to Ward, the disclosure of which is herein incorporated by reference.

Depending on the features selected, the user may provide appropriate personalization information that will later be incorporated into the customized digital camera 10. Such personalization information can include personal digital data, for example, ASCII text providing the name, mailing address, phone number, or e-mail address of the user. The personalization information can also include names of people or events to be used to categorize images, and an address book of e-mail addresses to be displayed on the color image display 22. The personalization information can also include one or more border templates selected by the user.

In an alternative embodiment, the firmware memory is provided as a Read Only Memory (ROM) (not shown) that stores firmware that implements a plurality of different camera image processing algorithms. The digital camera 10 also includes a programmable memory (not shown) which stores camera settings. The processor 18 uses the stored camera settings to determine which camera image processing algorithms to implement, from the plurality of algorithms provided by the firmware. In this embodiment, the camera customization software displays a plurality of digital images having different appearances to the user. The user selects a preferred image, and the camera customization software determines the associated camera setting(s). The settings are then communicated to the digital camera 10 using the host interface 36 or the removable memory card 30, and are then stored in the camera programmable memory.

In another alternative embodiment, the camera customization software is executed by the digital camera 10. In this embodiment, the customization is done entirely using the digital camera 10, and the host computer 40 is not required. In this embodiment, the processor 18 displays a group of images on the color image display 22. These images can either be displayed simultaneously, as depicted in FIG. 3A and FIG. 3B, or sequentially, since it may be difficult to simultaneously view several images on the relatively small color image display 22. In the sequential case, a single image is displayed as part of a graphical user interface that allows the user to view other images. For example, the images may have a range of contrasts, with the first image displayed having normal contrast. Other images may then be displayed, either automatically after a set period of time (e.g., 2 seconds) or in response to a user input via the camera user interface 24. Alternatively, a single image may be displayed in a split-screen mode, where part of the image (e.g., the left half of the image) is processed using normal default settings and algorithms, and another part (e.g., the right half of the image) is processed using alternative settings or algorithms.

For example, the other images can correspond to image processing settings having various degrees of lower contrast or higher contrast. For instance, there may be five different images, corresponding to (1) normal contrast, (2) slightly lower than normal contrast (3) much lower than normal contrast, (4) slightly higher than normal contrast, and (5) much higher than normal contrast. The user then selects the image having the appearance (e.g., the contrast setting) they prefer. This process is repeated using additional sets of images to verify the contrast setting, or to determine settings for attributes, such as color saturation or sharpness, as described earlier in relation to FIG. 3A and FIG. 3B. The images used for the comparison may be prestored in the camera flash EPROM 28 when the camera firmware is stored in the digital camera 10, or may be images captured by the user using the digital camera 10 and processed by the processor 18 to provide the various image appearances.

In another embodiment, the customization is done in a retail establishment which sells the digital camera 10 or other digital imaging device. The camera firmware stored in the Flash EPROM 28 is customized at the time of purchase, either by a clerk operating a computer with input from the purchaser concerning their preferred images, or by a customer-operated kiosk.

In another embodiment, the camera customization software permits two or more different users to customize the appearance of images provided by the digital camera 10 or other digital imaging devices, and to store the corresponding firmware components or firmware settings in the Flash EPROM 28. When the digital camera 10 is powered on, a list of users is displayed on the image display 22 and the user selects their name using the camera user interface 24. In response to this user input, the processor 18 uses the appropriate firmware components or firmware settings stored in the Flash EPROM 28 to provide the image appearance and feature set for that particular user. Alternatively, when the digital camera 10 is powered on, the settings for the last user can be employed, and a camera preferences menu can be used to select a different user if desired.

Figure 8:
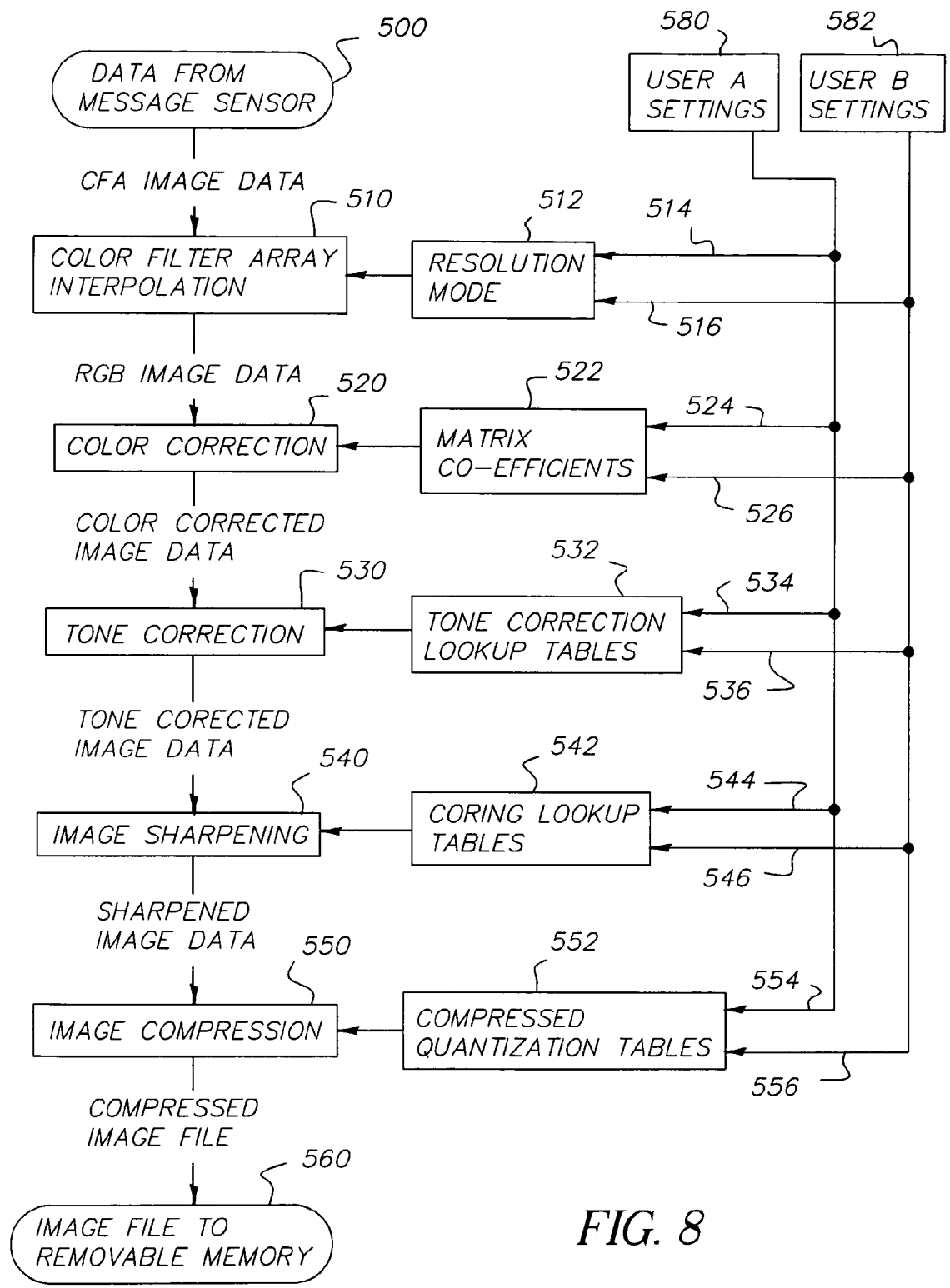
FIG. 8 is a flow diagram depicting image processing operations performed within the digital imaging device of FIG. 1A.

FIG. 8 is a flow diagram depicting image processing operations that can be performed by the processor 18 in the digital camera 10 in order to process the images from the image sensor 14 provided by the A/D converter 16. The processing performed by the digital camera 10 to process a particular image is determined by user settings, for example, User A settings 580 or User B settings 582, shown in FIG. 8. The User A settings 580 include a resolution setting 514, a color correction setting 524, a tone correction setting 534, a sharpness setting 544, and a compression setting 554. The User B settings 582 include a resolution setting 516, a color correction setting 526, a tone correction setting 536, a sharpness setting 546, and a compression setting 556.

The Bayer pattern color filter array data (block 500) which has been digitally converted by the A/D converter 16 is interpolated in block 510 to provide red, green and blue (ROB) image data values at each pixel location. The color filter array interpolation in block 510 can use the luminance CFA interpolation method described in commonly-assigned U.S. Pat. No. 5,652,621, entitled "Adaptive color plane interpolation in single sensor color electronic camera" to Adams et. al., the disclosure of which is herein incorporated by reference. The color filter array interpolation in block 510 can also use the chrominance CFA interpolation method described in commonly-assigned U.S. Pat. No. 4,642,678, entitled "Signal processing method and apparatus for producing interpolated chrominance values in a sampled color image signal", to Cok, the disclosure of which is herein incorporated by reference.

To provide multiple resolution images, for example, a full resolution image and a reduced resolution image, the color filter array 20 interpolation in block 510 can use the method described in commonly-assigned U.S. Pat. No. 5,493,335, entitled "Single sensor color camera with user selectable image record size", to Parulski et. al., the disclosure of which is herein incorporated by reference. The resolution mode provided in block 512 is either the full or reduced resolution, corresponding to the current user setting, which can be either User A resolution setting 514 or User B resolution setting 516 shown in FIG. 8.

The RGB image data is color corrected in block 520 using, for example, the 3×3 linear space color correction matrix 20 depicted in FIG. 3 of commonly-assigned U.S. Pat. No. 5,189,511, entitled "Method and apparatus for improving the color rendition of hardcopy images from electronic cameras" to Parulski et al., the disclosure of which is incorporated herein by reference. The color correction matrix co-efficients which are stored in the flash EPROM 28 in the digital camera 10 can include the following:

Setting 1 (normal color reproduction)

$Rout = 1.50Rin - 0.30Gin - 0.20Bin$ $Gout = -0.40Rin + 1.80Gin - 0.40Bin$ $Bout = -0.20Rin - 0.20Gin + 1.40Bin$ Setting 2 (slightly saturated color reproduction)

$Rout = 1.75Rin - 0.45Gin - 0.30Bin$ $Gout = -0.60Rin + 2.20Gin - 0.60Bin$ $Bout = -0.30Rin - 0.30Gin + 1.60Bin$ Setting 3 (saturated color reproduction)

$Rout = 2.00Rin - 0.60Gin - 0.40Bin$ $Gout = -0.80Rin + 6.60Gin - 0.80Bin$ $Bout = -0.40Rin - 0.40Gin + 1.80Bin$ Setting 4 (slightly desaturated color reproduction)

$Rout = 1.35Rin - 0.20Gin - 0.15Bin$ $Gout = -0.50Rin + 2.00Gin - 0.50Bin$ $Bout = -0.25Rin - 0.25Gin + 1.50Bin$ Setting 5 (desaturated color reproduction)

$Rout = 1.25Rin - 0.15Gin - 0.10Bin$ $Gout = -0.20Rin + 1.40Gin - 0.20Bin$ $Bout = -0.10Rin - 0.10Gin + 1.20Bin$ When the user(s) select their preferred images as described earlier in reference to blocks 182 and 192 of FIG. 2, the corresponding color matrix coefficients are used as the user(s) preferred setting. For example, User A may have selected Setting 1 (normal color reproduction) and User B may have selected Setting 4 (slightly desaturated color reproduction). Therefore, Setting 1 is used if User A is the current user of the digital camera 10, and Setting 4 is used if User B is the current user of the digital camera 10. The color matrix coefficients provided in block 522 of FIG. 8 include the appropriate coefficients for the user(s). The color matrix coefficients stored in the digital memory of the digital imaging device (such as firmware memory 28 of digital camera 10, firmware memory 370 of an APS film scanner 350, firmware memory 428 of a digital printer 400, or firmware memory 478 of a digital image processing system 450) can include only the coefficients selected by the user(s) (e.g., only the co-efficients for setting 1 and setting 4). Alternatively, the color matrix co-efficients stored in the digital imaging device can include the co-efficients for all settings, along with parameter values that provides the User A setting (e.g. setting 1) and User B setting (e.g. setting 4) to be used in color correction block 520. In this case, the matrix coefficients can be stored in a Read-only memory (e.g., a ROM memory), and only the parameter values (e.g. User A=setting 1 and User B=setting 4) need to be stored in a reprogrammable firmware memory (e.g., Flash EPROM memory).

Figure 9:
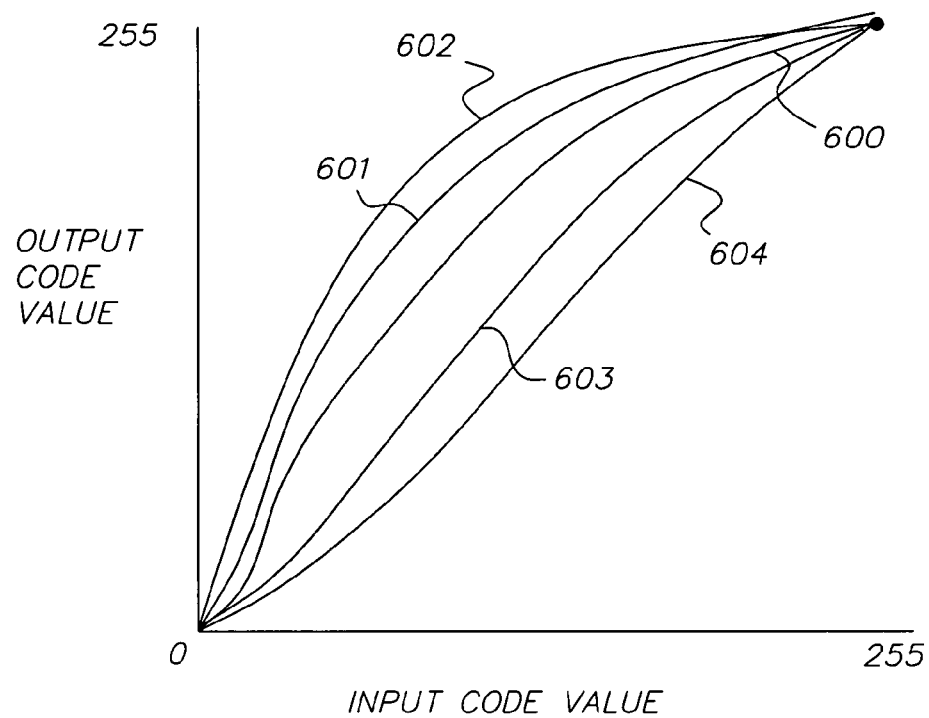
FIG. 9 depicts five tone correction curves that can be used in block 530 of FIG. 8.

The color corrected image data is tone corrected in block 530 of FIG. 8. This tone correction 530 can use, for example, the lookup table corresponding to FIG. 2 of U.S. Pat. No. 5,189,511 cited above. In the present invention, a plurality of tone correction Lookup tables is provided in block 532. These can include lookup tables corresponding to the five curves depicted in FIG. 9, which include a "normal" tone correction curve 600, a "slightly high contrast" tone correction curve 601, a "high contrast" tone correction curve 602, a "slightly low contrast" tone correction curve 603, and a "low contrast" tone correction curve 604. When the user(s) select their preferred images as described earlier in reference to FIG. 3A and FIG. 3B, the corresponding setting is used as the user(s) preferred contrast setting. The appropriate lookup tables are stored in the firmware memory of the digital imaging device, such as flash EPROM 28 in the digital camera 10.

The tone correction lookup table used in tone correction block 530 for a particular image is determined by the current user's preferred setting, which can be either the User A tone correction setting 534 or the User B tone correction setting 536.

In an alternative embodiment, the color correction image processing operations 520 and tone correction image processing operations 530 are provided by a three-dimensional lookup table (3D LUT). An example of such a 3D LUT is described in commonly-assigned U.S. patent application Ser. No. 09/540,807 (Kodak docket 79,424), filed Mar. 31, 2000, entitled "A Color Transform Method for the Mapping of Color in Images" to Geoffrey Wolfe et al., the disclosure of which is incorporated herein by reference. The 3D LUT is more complex than the 3×3 matrix and single-channel LUT approach described above. However, it allows better control of color saturation. For example, it allows increased color saturation for most memory colors without increasing the saturation of flesh tone colors and near-neutral colors.

Figure 10:
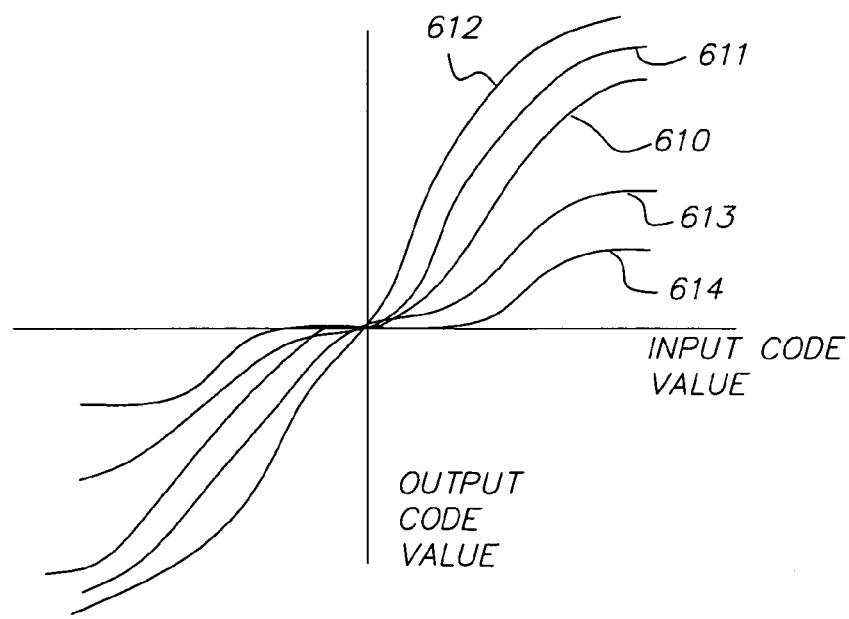
FIG. 10 depicts five Coring look-up tables that can be used in block 540 of FIG. 8.

The image sharpening provided in block 540 of FIG. 8 can utilize the method described in commonly-assigned U.S. Pat. No. 4,962,419 ('419 patent), entitled "Detail processing method and apparatus providing uniform processing of horizontal and vertical detail components" to Hibbard et. al., the disclosure of which is incorporated herein by reference. In the present invention, the coring lookup table depicted in FIG. 4 of the '419 patent is selected from a plurality of coring lookup tables that correspond to the curves depicted in FIG. 10. The selected table is used for the image processing operations for the customized digital camera 10.

These lookup tables include a "normal" sharpening level curve 610, a "slightly sharp" curve 611, an "extra sharp" curve 612, a "slightly less sharp" curve 613, and a "less sharp" curve 614. The appropriate lookup tables are stored in the firmware memory of the digital imaging device, such as flash EPROM 28 in the digital camera 10. The lookup table used in image sharpening block 540 for a particular image is determined by the current user setting, which can be either the User A sharpness setting 544 or the User B sharpness setting 546.

The image compression provided in block 550 of FIG. 8 can use the method described in commonly-assigned U.S. Pat. No. 4,774,574 (the '574 patent), entitled "Adaptive block transform image coding method and apparatus" to Daly et. al., the disclosure of which is incorporated herein by reference. The compression quantization tables provided in block 552 include a plurality of quantization tables, for example, five different tables, for the quantize block 26 in FIGS. 1A and 1B of the '574 patent. These tables provide different quality levels and average file sizes for the compressed image file 560 provided to the removable memory card 30 by the digital camera 10. The appropriate quantization tables are stored in the firmware memory of the digital imaging device, such as flash EPROM 28 in the digital camera 10.

The quantization table used in image compression block 550 of FIG. 8 for a particular image is determined by the current user setting, which can be either by the User A compression setting 554 or the User B compression setting 556 shown in FIG. 8.

As described earlier, the User A settings 580 and the User B settings 582 shown in FIG. 8 can be determined as part of the camera customization process depicted in FIG. 2. In this case, the settings 580 and 582 are downloaded from the host computer 40 to the digital camera 10. As previously described, the settings 580 and 582 are used to select particular matrix coefficients (block 522), tone correction lookup tables (block 532), coring lookup tables (block 542), and compression quantization tables (block 552) stored in the flash EPROM 28 of the digital camera 10 (shown in FIG. 1A). Alternatively, the matrix coefficients (block 522), tone correction lookup tables (block 532), coring lookup tables (block 542), and compression quantization tables (block 552) can be stored in a ROM (not shown), and only the camera settings 580 and 582 can be stored in a reprogrammable memory, such as the flash EPROM 28. Alternatively, only the particular matrix coefficients (block 522), tone correction lookup tables (block 532), coring lookup tables (block 542), and compression quantization tables (block 552) selected by Users A and B can be downloaded from the host computer 40 to the digital camera 10 and stored in the flash EPROM 28. Alternatively, the user selection can be performed using the camera GUI 25. In this embodiment, the matrix coefficients (block 522), tone correction lookup tables (block 532), coring lookup tables (block 542), and compression quantization tables (block 552) are stored in the flash EPROM 28 or in the ROM (not shown), and the user settings 580 and 582 are stored in a reprogrammable memory, such as the flash EPROM 28.

Figure 5:
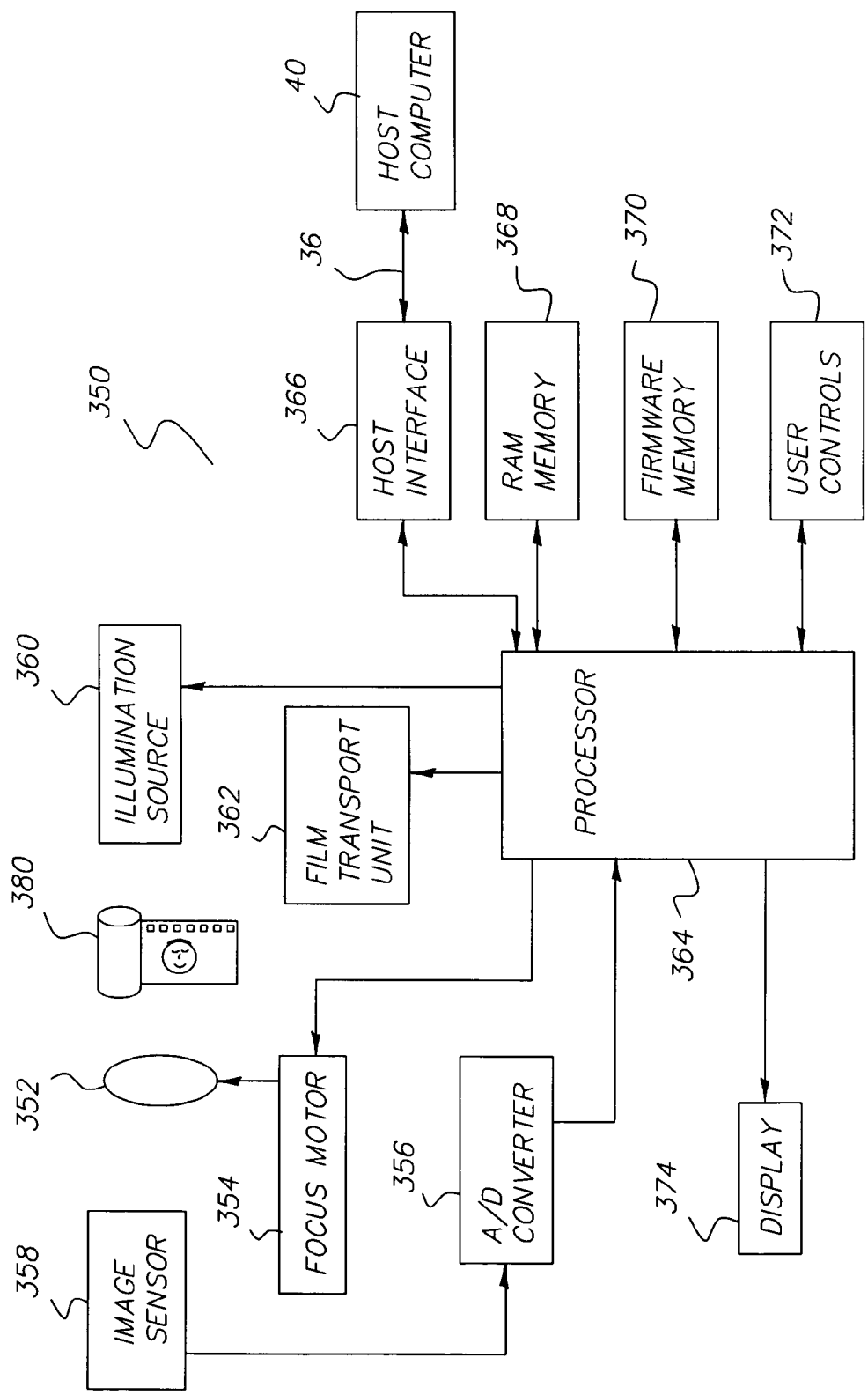
FIG. 5 is a block diagram of a digital scanner in accordance with the present invention.

The invention may also be utilized in a digital scanner, such as a film or print scanner. FIG. 5 is a block diagram of an Advanced Photo System (APS) film scanner 350, which is a second type of digital imaging device that can be customized using preferred images in accordance with the present invention, for example, by using the host computer 40 depicted in FIG. 1B. The APS film scanner 350 includes a scanner lens 352 controlled by a focus motor 354 for focusing light, provided from an illumination source 360, which illuminates an APS filmstrip 380. The lens focus motor 354 and illumination source 360 are controlled by a processor 364. A film transport unit 362 advances the frames of the APS film 380 under the control of the processor 364. An image sensor 358, such as a linear or area-array CCD or a CMOS sensor, provides an analog image signal that is converted to digital form by an A/D converter 356. The processor 364 executes firmware stored in firmware memory 370, which can be Flash EPROM memory. The scanned digital image from one frame of the APS film 380 is temporarily stored in RAM memory 368 under the control of the processor 364. The processor 364 then processes this stored image in order to provide color correction, tone correction, edge enhancement, and image compression as described earlier in relation to FIG. 8. The processed image is then transferred to a host computer 40 via a host interface 366, which connects to an interface cable 36. The interface cable 36 can be, for example, a USB cable which connects to an interface 46 in the host computer 40 (see FIG. 1B). Alternatively, the host interface can utilize an RS-232 interface, SCSI interface, IEEE 1394 interface, or other type of cable interface, or a wireless interface can be utilized.

To customize the image processing settings of the image processing operations performed by the processor 364 in the APS film scanner 350, a process similar to that described earlier in relation to FIG. 2 can be used. In this case, the images depicted in FIG. 3A and FIG. 3B are displayed on the display monitor 52 by the CPU 50. After the user selects their preferred images, the corresponding firmware components or parameter values are transferred to the firmware memory 370 in the APS film scanner 350. Alternatively, the APS film scanner 350 can include an image display 374 and user controls 372 in order to allow the user to select preferred images to customize the APS film scanner 350 without the use of the host computer 40.

Figure 6:
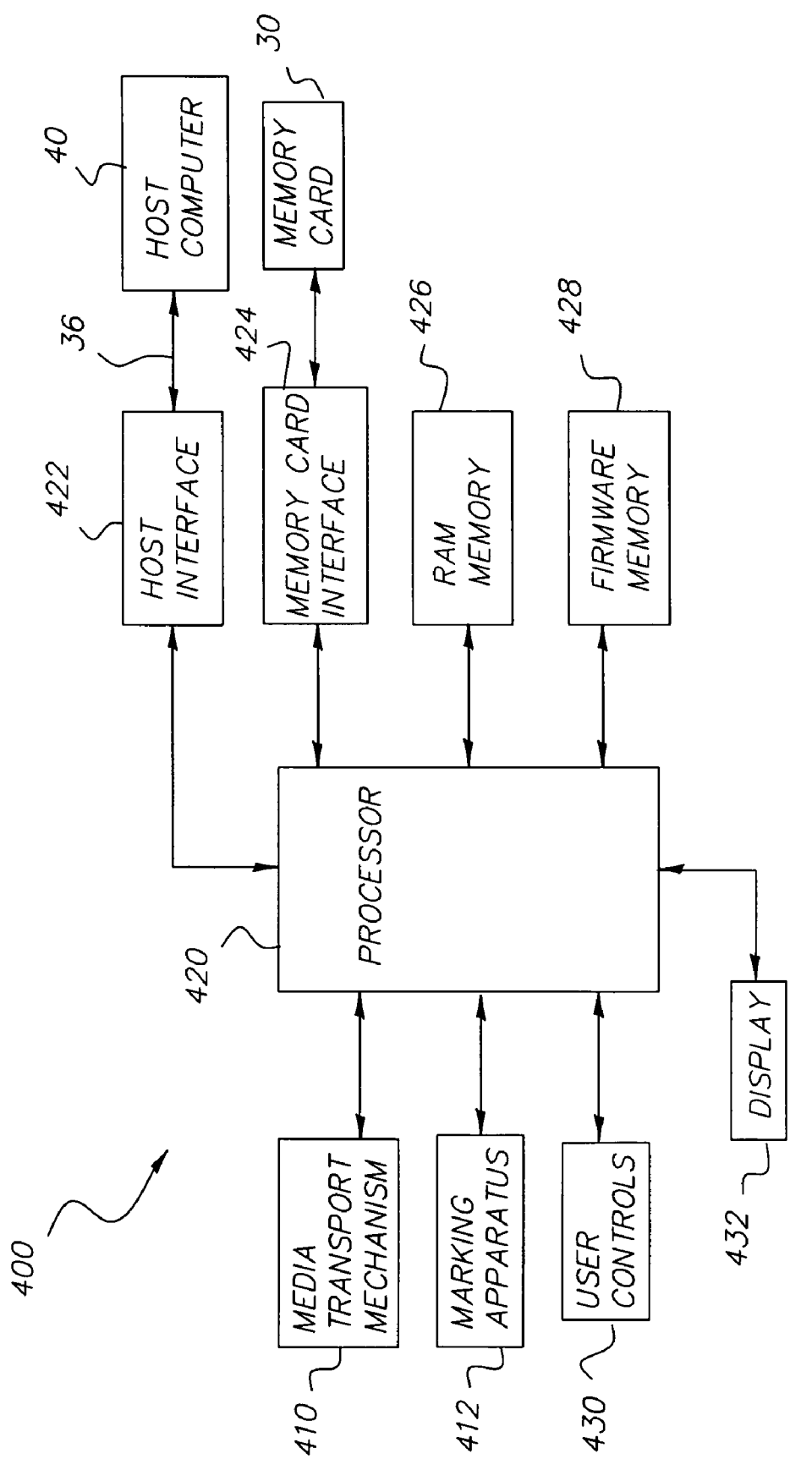
FIG. 6 is a block diagram of a digital printer in accordance with the present invention.

As shown in FIG. 6, the invention can also be utilized in a digital printer 400. The digital printer 400 produces digital prints (not shown) from images provided on a removable memory card 30 via a memory card interface 424, or via a host interface 422 from a host computer 40. The host interface 422 connects to an interface cable 36 which may utilize, for example, a USB cable which connects to the interface 46 in the host computer 40 (see FIG. 1B). Alternatively, the host interface 422 can utilize an RS-232 interface, SCSI interface, IEEE 1394 interface, or other type of cable interface, or a wireless interface can be utilized.

The digital printer 400 includes a media transport mechanism 410, such as a motor-driven roller, for moving hard copy media (e.g., ink jet paper) past a marking apparatus 412 (e.g., a color ink jet head) under the control of a processor 420. The processor 420 controls the marking apparatus 412 to provide controlled amounts of various color inks or dyes in order to produce a pictorial image on the hardcopy media.

If the image to be printed is supplied in a compressed image format (e.g., JPEG compression), the processor 420 decompresses the image. The processor 420 can also provide interpolation, color and tone correction, half-toning, sharpening, or other types of digital image processing to prepare the image data properly to be used by the marking apparatus 412. In particular, the processor 420 can provide the color correction, tone correction, and image sharpening described earlier in relation to FIG. 8.

The processed images are temporarily stored in RAM memory 426 under the control of the processor 420. The processor 420 in the digital printer 400 is controlled by firmware stored in firmware memory 428. To customize the image processing settings of the image processing operations performed by the processor 420 in the digital printer 400, a process similar to that described earlier in relation to FIG. 2 can be used. In this case, the images depicted in FIG. 3A and FIG. 3B are displayed on the display monitor 52 by the CPU 50. After the user selects their preferred images, the corresponding firmware components or parameter values are transferred to the firmware memory 428 in the digital printer 400. Alternatively, the digital printer 400 can include an image display 432 and user controls 430 in order to allow the user to select preferred images to customize the digital printer 400 without the use of the host computer 40.

Figure 7:
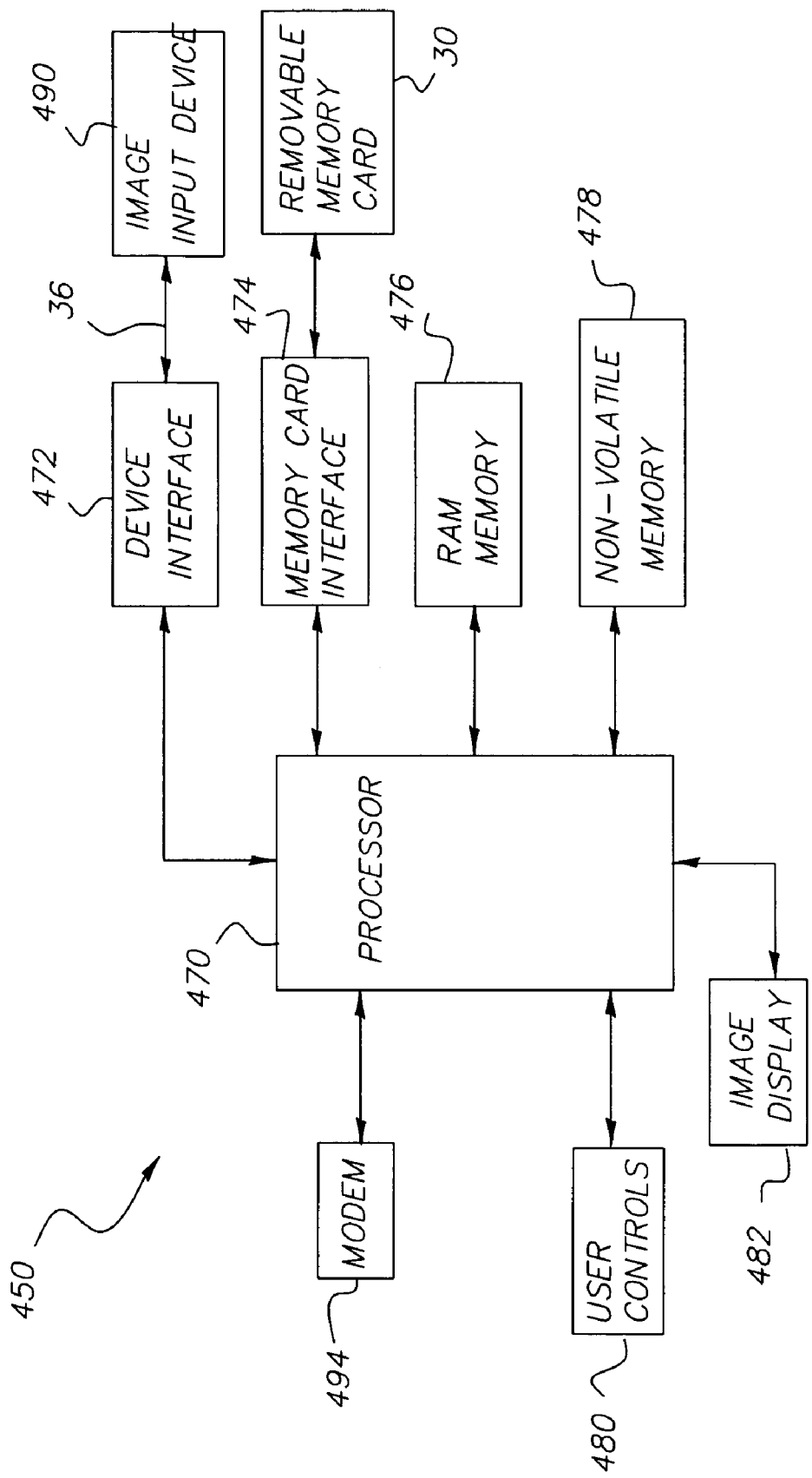
FIG. 7 is a block diagram of a digital image processing system in accordance with the present invention.

As shown in FIG. 7, the invention can also be utilized in a digital image processing system 450. The digital image processing system 450 processes images provided on a removable memory card 30 via a memory card interface 474, or via a device interface 472 from an image input device 490. The image input device 490 can be, for example, the digital camera 10 (shown in FIG. 1A) or the APS film scanner 350 (shown in FIG. 5). The device interface 472 connects to a interface cable 36 which can be, for example, a USB cable interface. Alternatively, the device interface 472 can utilize an RS-232 interface, SCSI interface, IEEE 1394 interface, or other type of cable interface, or a wireless interface can be utilized.

Image processing operations are performed by a processor 470. If the images to be processed are supplied in a compressed image format (e.g., JPEG compression), the processor 470 decompresses the image. The processor 470 can also provide color and tone correction, sharpening, or other types of digital image processing to modify the appearance of the input images. In particular, the processor 470 can provide some or all of the color correction, tone correction, and image sharpening algorithms described earlier in relation to FIG. 8. The processed images can be stored on a removable memory card 30 or transferred to a remote location via a modem 494, which can, for example, provide a connection to the Internet. RAM memory 476 is used to temporarily store the results of intermediate image processing operations.

The processor 470 is controlled by software programs stored in nonvolatile memory 478. To customize the image processing firmware or the settings used by the image processing operations performed by the processor 470 in the digital image processing system 450, a process similar to that described earlier in relation to FIG. 2 can be used. In this case, the images depicted in FIG. 3A and FIG. 3B are displayed on the image display 482 by the processor 470. After the user selects their preferred images, the corresponding software components or parameter values are used to perform processing of images input to the digital image processing system 450.

Computer program products, such as readable storage medium, can be used to store the customization software, and also the desired firmware components in accordance with the present invention. The readable storage medium can be a magnetic storage media, such as a magnetic disk (such as a floppy disk) or magnetic tape; optical storage media, such as an optical disk, an optical tape, or a machine readable bar code; solid state electronic storage devices, such as a random access memory (RAM) or a read only memory (ROM); or any other physical device or medium employed to store computer programs.

The invention has been described in detail with particular reference to certain preferred embodiments thereof, but it will be understood that variations and modifications can be effected within the spirit and scope of the invention.

PARTS LIST 10 digital camera
11 optical viewfinder
12 lens
13 zoom switch
14 image sensor
15 shutter button
16 analog-to-digital converter
18 processor
20 memory card interface
22 image display
23 video output driver
24 camera user interface
25 camera graphical user interface
26 host interface
27 digital-to-analog converter
28 Flash EPROM
29 miniature speaker
30 removable memory card
31 TV display
32 CD-ROM disc
34 Floppy disk
36 interface cable
40 host computer
42 CD-ROM drive
44 Floppy disk drive
46 interface
48 memory card reader
50 central processing unit
52 display monitor
54 keyboard
55 mouse
56 hard drive
58 home printer
60 modem
70 Network Service Provider
72 modem
74 computer
76 camera firmware database
78 billing system
80 user button
81 user button
82 user button
83 user button
84 user button
86 capture/review mode switch
220 preferred image window
222A smaller image window
222B smaller image window
222C smaller image window
222D smaller image window
222E smaller image window
224 indicator
226 "done" icon
228 user instructions
350 Advanced Photo System (APS) film scanner
352 scanner lens
354 focus motor
356 analog-to-digital converter 358 image sensor
360 illumination source
362 film transport unit
364 processor
366 host interface
368 RAM memory
370 firmware memory
372 user controls
374 image display
380 APS filmstrip
400 digital printer
410 media transport mechanism
412 marking apparatus
420 processor
422 host interface
424 memory card interface
426 RAM memory
428 firmware memory
430 user controls
432 image display
450 digital image processing system
470 processor
472 device interface
474 memory card interface
476 RAM memory
478 nonvolatile memory
480 user controls
482 image display
490 image input device
494 modem
514 resolution setting
516 resolution setting
524 User A color correction setting
526 User B color correction setting
534 User A tone correction setting
536 User B tone correction setting
544 User A sharpness setting
546 User 13 sharpness setting
554 User A compression setting
556 User B compression setting
580 User A settings
582 User B settings
600 "normal" tone correction curve
602 "high contrast" tone correction curve
604 "low contrast" tone correction curve
608 "less sharp" curve
610 "normal" sharpening level curve
612 "extra sharp" curve

What is claimed is:

1. A method for customizing a digital imaging device for at least one particular user by storing at least one firmware component in a programmable memory of the digital imaging device which controls the operation of the digital imaging device, the method comprising the steps of:
   (a) providing customization software which can access a plurality of firmware components providing different image appearances, the customization software producing a plurality of images of the same scene having a corresponding plurality of different appearances;
   (b) the user selecting one of the plurality of images having a preferred appearance to cause the customization software to access the corresponding firmware component(s); and
   (c) providing the selected corresponding firmware component(s) to the digital imaging device and programming the programmable memory of the digital imaging device to store the corresponding firmware component(s) to thereby customize the digital imaging device;
   wherein the digital imaging device includes a display and wherein step (a) includes displaying on the display an image corresponding to a current parameter setting and a plurality of images corresponding to alternative parameter settings that can be selected by the user.

2. The method according to claim 1 wherein the customization software is provided external to the digital imaging device.

3. The method according to claim 2 wherein the customization software is provided on a computer program product.

4. The method according to claim 2 wherein the customization software is provided by a Network Service Provider.

5. The method according to claim 2 wherein step (b) includes using a host computer to select the at least one preferred image.

6. The method according to claim 5 wherein the host computer is provided in a retail establishment.

7. The method according to claim 1 wherein the digital imaging device is a digital camera.

8. The method according to claim 1 wherein the digital imaging device is a print or film scanner.

9. The method according to claim 1 wherein the digital imaging device is a hardcopy printer.

10. The method according to claim 1 wherein the digital imaging device further includes a processor, and wherein the firmware component(s) can be executed by the processor to control the operation of the digital imaging device.

11. The method according to claim 1 wherein the digital imaging device is a digital computer incorporating an image modification application.

12. At least one computer program product stored on a computer readable medium having the customization software stored thereon for performing the method according to claim 1.

13. The method according to claim 1 wherein the plurality of images of the same scene depict different sharpness levels.

14. The method according to claim 1 wherein the plurality of images of the same scene depict different contrast levels.

15. The method according to claim 1 wherein the plurality of images of the same scene depict different color saturation levels.

16. The method according to claim 1 wherein step (a) includes producing hardcopy prints of the plurality of images of the same scene.

17. The method according to claim 1 wherein step (b) further includes, in response to the user selecting the one of the plurality of images, modifying the image corresponding to the current parameter setting to match the image selected by the user.

18. A method for customizing a digital imaging device for at least one particular user by storing at least one parameter in a programmable memory of the digital imaging device which controls at least one image processing operation of the digital imaging device, the method comprising the steps of:
   (a) providing a default setting that can be used to control the at least one image processing operation;
   (b) displaying a plurality of images of the same scene having a corresponding plurality of different appearances and providing a corresponding plurality of parameter values;
   (c) the user selecting one of the displayed plurality of images as a preferred image;

(d) storing the parameter value corresponding to the selected preferred image in the programmable memory of the digital imaging device, and (e) utilizing the stored parameter value to control the image processing operation of the digital imaging device, to thereby customize the digital imaging device.

19. The method according to claim 18 wherein the digital imaging device further includes a processor, and wherein the image processing operation is provided by the processor.

20. A digital camera configured according to the method of claim 18.

21. At least one computer program product stored on a computer readable medium having the customization software stored thereon for performing the method according to claim 18.

22. The method according to claim 18 wherein the parameter values provide variations in image sharpness.

23. The method according to claim 18 wherein the parameter values provide variations in image contrast.

24. The method according to claim 18 wherein the parameter values provide variations in color saturation.

25. The method according to claim 18 wherein the digital imaging device includes a display, and wherein the plurality of images that can be selected by the user is displayed on the display.

26. The method according to claim 18 wherein steps (b), (c), and (d) are performed a plurality of times for different image attributes.

27. The method according to claim 26 wherein the different image attributes include contrast and color saturation.

28. A method for providing customized firmware for a digital imaging device for at least one particular user, the customized firmware having at least one firmware component which controls the operation of the digital imaging device, the method comprising the steps of:
   (a) providing customization software executed external to the digital imaging device which can access software code associated with a plurality of different image appearances;
   (b) displaying a plurality of digital images of the same subject remote from the digital image device, each of the plurality of digital images having corresponding firmware component(s);
   (c) the user selecting at least one desired image from the displayed plurality of digital images of the same subject to cause the customization software to access the software code associated with the at least one selected image; and
   (d) providing a firmware component(s) corresponding to the user selected image;
   wherein the digital imaging device includes a display, and wherein step (b) includes displaying, on the display, an image corresponding to a current parameter setting and a plurality of images corresponding to alternative parameter settings that can be selected by the user.

29. The method of claim 28 further including the step of providing the selected corresponding firmware component(s) to the digital imaging device and reprogramming a programmable memory of the digital imaging device to store the corresponding firmware component(s) to thereby customize the digital imaging device.

30. A digital printer configured according to the method of claim 29.

31. A digital camera configured according to the method of claim 29.

32. At least one computer program product stored on a computer readable medium having the customization software stored thereon for performing the method according to claim 28.

33. A method for customizing a digital imaging device for at least one particular user by storing image processing settings in a programmable memory of the digital imaging device, the method comprising the steps of:
   (a) providing customization software executed external to the digital imaging device for displaying a plurality of images of the same subject having different appearances that can be provided by the digital imaging device;
   (b) the user selecting a preferred image from the plurality of displayed images;
   (c) the customization software determining at least one parameter setting corresponding to the selected image; and
   (d) providing the at least one parameter setting to the digital imaging device and programming the programmable memory of the digital imaging device to store the at least one parameter setting to thereby customize the digital imaging device;
   wherein the digital imaging device includes a display, and wherein step (a) includes displaying on the display, an image corresponding to a current parameter setting and a plurality of images corresponding to alternative parameter settings that can be selected by the user.

34. The method according to claim 33 wherein the digital imaging device is customized to include different parameter settings for at least two different users.

35. A digital printer configured according to the method of claim 33.

36. A digital camera configured according to the method of claim 33.

37. At least one computer program product stored on a computer readable medium having the customization software stored thereon for performing the method according to claim 33.

38. A method for customizing a digital imaging device for at least one particular user by storing at least one setting in a programmable memory of the digital imaging device which controls an image processing operation of the digital imaging device, the method comprising the steps of:
   (a) providing customization software which can access software code associated with a plurality of different digital imaging device settings;
   (b) displaying a plurality of digital images provided by the software code corresponding to different digital imaging device settings;
   (c) the user choosing a desired digital image from the plurality of displayed digital images to cause the customization software to determine at least one associated setting; and
   (d) programming the programmable memory to store the at least one associated setting to thereby customize the digital imaging device.

39. The method of claim 38 wherein the at least one digital imaging device setting controls edge enhancement, color correction, or tone correction.

* * * * *